(12) United States Patent  (10) Patent No.: US 8,971,468 B1
Novellini  (45) Date of Patent: Mar. 3, 2015

(54) INCREASING THE RESOLUTION OF SERIAL DATA RECOVERY UNITS (DRUS) BASED ON INTERLEAVED FREE RUNNING OVERSAMPLERS

(71) Applicant: Xilinx, Inc., San Jose, CA (US)

(72) Inventor: Paolo Novellini, Gorgonzola (IT)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/064,539

(22) Filed: Oct. 28, 2013

(51) Int. Cl.
*H04L 7/00* (2006.01)
*H04L 1/00* (2006.01)

(52) U.S. Cl.
CPC .................................... *H04L 1/0091* (2013.01)
USPC ........... 375/355; 375/226; 375/326; 375/340; 375/354; 375/371; 455/516; 370/516; 327/163

(58) Field of Classification Search
CPC . H04L 1/0091; H04L 1/0071; H04B 1/70757
USPC ................ 375/226, 326, 340, 354, 355, 371; 455/516; 370/516; 327/163
See application file for complete search history.

(56) References Cited

U.S. PATENT DOCUMENTS

| | | | | |
|---|---|---|---|---|
| 5,852,477 | A * | 12/1998 | Limberg | 348/725 |
| 7,778,286 | B2 * | 8/2010 | Agazzi et al. | 370/516 |
| 7,894,728 | B1 * | 2/2011 | Sun et al. | 398/208 |
| 2014/0169442 | A1 * | 6/2014 | Hashida et al. | 375/233 |

OTHER PUBLICATIONS

Specification and drawings for U.S. Appl. No. 13/111,868, filed May 19, 2011, Novellini.
Specification and drawings for U.S. Appl. No. 13/625,100, filed Sep. 24, 2012, Novellini.
Khoini-Poorfard, Ramin et al., "Mismatch Effects in Time-Interleaved Oversampling Converters," *Proc. of the 1994 IEEE International Symposium on Circuits and Systems*, May 30, 1994, pp. 429-432, vol. 5, IEEE, Piscataway, New Jersey, USA.
Riccardi, Daniele et al., *An Attribute-Programmable PRBS Generator and Checker*, XAPP884 (v1.0), Jan. 10, 2011, pp. 1-8, Xilinx, Inc., San Jose, California, USA.
Sin, Sai-Weng et al., "A Generalized Timing-Skew-Free, Multi-Phase Clock Generation Platform for Parallel Sampled-Data Systems," *Proc. of the 2004 International Symposium on Circuits and Systems*, pp. I-369 to I-372, vol. 1, IEEE, Piscataway, New Jersey, USA.
U, Seng-Pan et al., "Design and Analysis of Low Timing-Skew Clock Generation for Time-Interleaved Sampled-Data Systems,", *Proc. of the 2002 International Symposium on Circuits and Systems*, pp. IV-441 to IV-444, vol. 4, IEEE, Piscataway, New Jersey, USA.

* cited by examiner

*Primary Examiner* — Leon Flores
(74) *Attorney, Agent, or Firm* — Gerald Chan

(57) ABSTRACT

The methods and apparatus disclosed herein provide an operative system for increasing the resolution of serial DRUs based on interleaved free running oversamplers. In particular, this system uses incoming data to measure and to compensate the skew between two or more free running oversamplers (e.g., SerDes), without the need for any hardware design requirement relating to the precision of the relative skew of the oversamplers.

20 Claims, 10 Drawing Sheets

INCREASING THE RESOLUTION OF SERIAL DATA RECOVERY UNITS (DRUS) BASED ON INTERLEAVED FREE RUNNING OVERSAMPLERS

TECHNICAL FIELD

The present disclosure relates to data recovery units (DRUs). In particular, the disclosure relates to increasing the resolution of serial DRUs based on interleaved free running oversamplers.

BACKGROUND

Currently, two or more free running oversamplers may be interleaved with one another to obtain sampled data with higher resolution. However, the hardware employed must provide a negligible interleaving phase error for the process, voltage, and temperature (PVT) variations. This requirement appears to be a serious limitation, because oversamplers typically are not designed with this goal in mind. Thus, this requirement is typically very difficult to fulfill, due to many impairments that can arise at the silicon and package levels.

Therefore, there is a need for a solution that aims at measuring and compensating the relative skew of two oversamplers during runtime.

SUMMARY

A system for increasing resolution of recovery of serial data includes X free running oversamplers, and X−1 fractional-unit interval (UI) compensation unit(s) coupled to receive a serial data input signal, wherein X is at least two. The fractional-UI compensation unit(s) is associated with respective one(s) of the free running oversamplers, wherein one of the free running oversamplers not associated with any of the fractional-UI compensation unit(s) is coupled to receive the serial data input signal, and the remaining one(s) of the free running oversamplers is coupled to receive respective output signal(s) from the respective fractional-UI compensation unit(s). The system also includes a plurality of data recovery units coupled with respective ones of the free running over samplers, wherein the data recovery units are configured to provide respective output signals based at least in part on output signals from the respective free running oversamplers. The system also includes a skew detector configured to difference the output signals from the data recovery units and to generate a skew measurement signal, wherein the fractional-UI compensation unit(s) is configured to provide the output signal(s) for the respective one(s) of the free running oversamplers based at least in part on the skew measurement signal. The system further includes a multi-UI compensation unit coupled to receive output signals from the free running oversamplers, and a user application configured to output a sampled data output signal based at least in part on an output signal from the multi-UI compensation unit.

Optionally, the system further includes a reference clock configured to synchronize, with a reference frequency, at least one of the free running oversamplers or the user application.

Optionally, the system further includes a low pass filter (LPF) configured to filter the skew measurement signal.

Optionally, the user application comprises a data recovery unit.

Optionally, the user application is further configured to output an enable signal.

Optionally, the fractional-UI compensation unit(s) is configured to compensate a skew from the skew measurement signal.

A system for increasing resolution of recovery of serial data includes X first free running oversamplers, and X second free running oversamplers coupled with respective ones of the first free running oversamplers to mirror the respective ones of the free running oversamplers, wherein X is at least two. The system also includes X−1 first fractional-unit interval (UI) compensation unit(s) coupled to receive a serial data input signal. The first fractional-UI compensation unit(s) is associated with respective one(s) of the first free running oversamplers, wherein one of the first free running oversamplers not associated with any of the first fractional-UI compensation unit(s) is coupled to receive the serial data input signal, and the remaining one(s) of the first free running oversamplers is coupled to receive output signal(s) from the respective first fractional-UI compensation unit(s). The system further includes X−1 second fractional-UI compensation unit(s) coupled to receive a free running pattern signal. The second fractional-UI compensation unit(s) is coupled with respective one(s) of the second free running oversamplers, wherein one of the second free running oversamplers not associated with any of the second fractional-UI compensation unit(s) is coupled to receive a free running pattern signal, and the remaining one(s) of the second free running oversamplers is coupled to receive output signal(s) from the respective second fractional-UI compensation unit(s). The system also includes a plurality of data recovery units coupled with respective ones of the second free running over samplers, wherein the data recovery units are configured to provide respect output signal(s) based at least in part on output signals from the respective second free running oversamplers. The system further includes a skew detector configured to difference output signals from the data recovery units to generate a skew measurement signal. The first fractional-UI compensation unit(s) is configured to provide the output signal(s) for the respective one(s) of the first free running oversamplers based at least in part on the skew measurement signal. The second fractional-UI compensation unit(s) is configured to provide the output signal(s) for the respective one(s) of the second free running oversamplers based at least in part on the skew measurement signal. The system further includes a multi-UI compensation unit coupled to receive output signals from the first free running oversamplers, and a user application configured to output a sampled data output signal based at least in part on an output signal from the multi-UI compensation unit.

Optionally, the system further includes a free running pattern generator configured to generate the free running pattern signal.

Optionally, the system further includes a reference clock to synchronize, with a reference frequency, at least one of the first free running oversamplers, the second free running oversamplers, or the user application.

Optionally, the system further includes a low pass filter (LPF) configured to filter the skew measurement signal.

Optionally, the user application comprises a data recovery unit.

Optionally, the user application is further configured to output an enable signal.

Optionally, each of the first fractional-UI compensation unit(s) and the second fractional-UI compensation unit(s) is configured to compensate a skew from the skew measurement signal.

A method for increasing resolution of recovery of serial data includes: mirroring X first free running oversamplers with respective X second free running oversamplers, wherein X is at least two, and wherein there are X−1 first fractional-unit interval (UI) compensation unit(s) associated with respective one(s) of the first free running oversamplers, and X−1 second fractional-UI compensation unit(s) associated with respective one(s) of the second free running oversamplers. The method also includes: receiving a free running pattern signal at the second fractional-UI compensation unit (s); providing output signal(s) from the second fractional-UI compensation unit(s) for respective one(s) of the second free running oversamplers that is associated with the second fractional-UI compensation unit(s); receiving the free running pattern signal at one of the second free running oversamplers that is not associated with any of the second fractional-UI compensation unit(s); providing output signals from data recovery units that are associated with the respective second free running oversamplers based at least in part on output signals from the respective second free running oversamplers; differencing the output signals from the data recovery units to obtain a skew measurement signal; receiving serial data input signal(s) at the first fractional-UI compensation unit(s); providing output signal(s) from the second fractional-UI compensation unit(s) for respective one(s) of the first free running oversamplers that is associated with the first fractional-UI compensation unit(s); receiving the serial data input signal at one of the first free running oversamplers that is not associated with any of the first fractional-UI compensation unit(s); providing an output from a multi-UI compensation unit based at least in part on output signals provided from the first free running oversamplers; and outputting a sampled data output signal from a user application based at least in part on the output from the multi-UI compensation unit. The output signal(s) from the second fractional-UI compensation unit(s) is provided based at least in part on the skew measurement signal. The output signal(s) from the first fractional-UI compensation unit(s) is provided based at least in part on the skew measurement signal.

Optionally, the method further includes generating the free running pattern signal.

Optionally, the method further includes synchronizing, with a reference frequency, at least one of the first free running oversamplers, the second free running oversamplers, or the user application.

Optionally, the method further includes generating the reference frequency.

Optionally, the method further includes filtering the skew measurement signal with a low pass filter (LPF).

Optionally, the user application comprises a data recovery unit.

Optionally, each of the first fractional-UI compensation unit(s) and the second fractional-UI compensation unit(s) compensates a skew from the skew measurement signal.

Other features will be described in the detailed description below. The features, functions, and advantages can be achieved independently in various embodiments of the present inventions or may be combined in yet other embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Figure 1A:
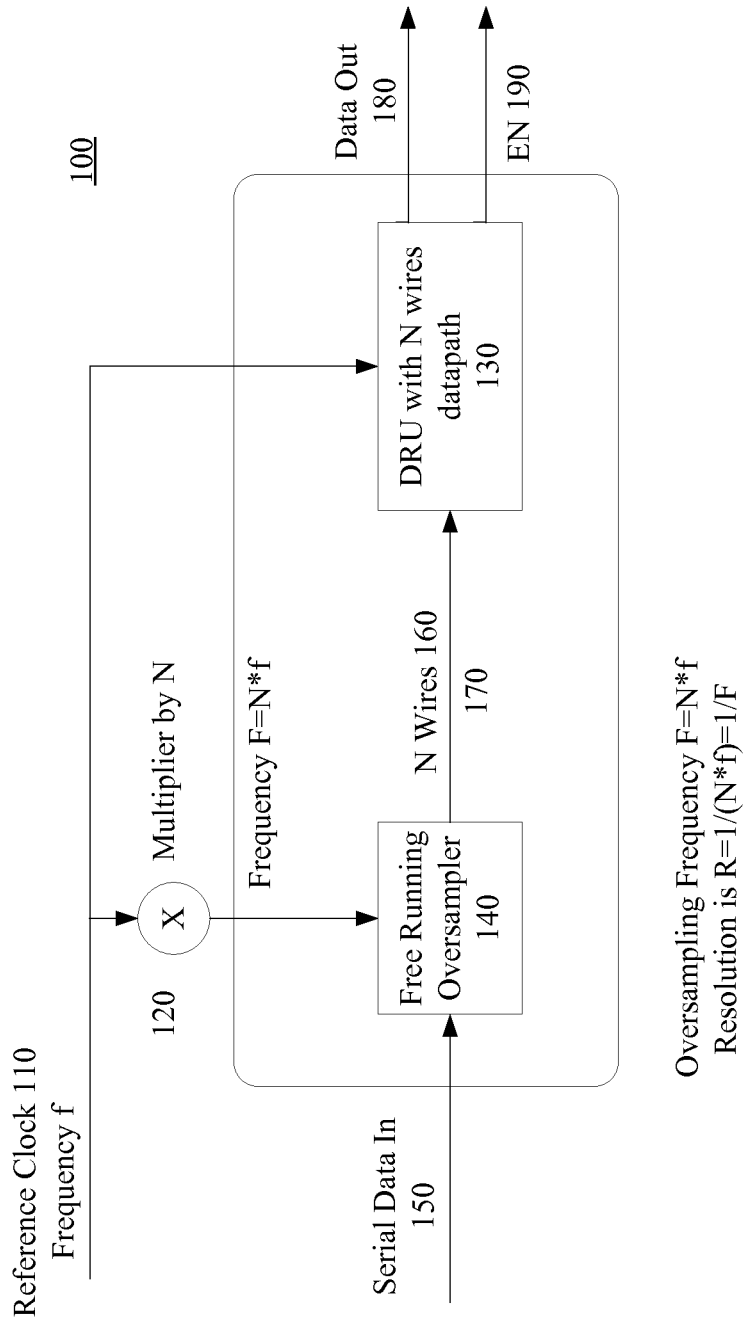
FIG. 1A is a schematic diagram depicting an architecture of a free running data recovery unit (DRU).

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

The methods and apparatus disclosed herein provide an operative system for increasing the resolution of serial DRUs based on interleaved free running oversamplers. In particular, this system uses incoming data to measure and to compensate the skew between two or more oversamplers (e.g., serializer/deserializers or SerDes), without the need for any hardware design requirement relating to the precision of the relative skew of the oversamplers. Note that while some of the examples herein use SerDes in oversampling mode, or other transceivers, to implement the oversamplers, other circuits can be used in other embodiments.

It should be noted that in order to increase the resolution of data recovery units (DRUs) based on oversampling, it is possible to use two or more transceivers (e.g., SerDes), in parallel, to sample the same incoming data with an appropriate relative skew. The skew is typically not known, and may change over process, voltage, and temperature (PVT). The present disclosure allows for measuring, during runtime, the relative skew of any two or more transceivers in free running oversampling mode, and for using this information to correct the skew over time and to keep the skew at a desired target level.

The system provided by the present disclosure may provide distinct advantages over previous systems. For example, by using two or more SerDes, the system increases the resolution of DRUs for a given technology. When employing only one SerDes, some applications cannot be implemented because the resolution is not high enough. As such, the disclosed system allows for the use of some applications that otherwise are not currently possible in a given technology. Further, constraints on the hardware skew are reduced or removed. The system simply measures the skew during runtime and corrects the skew. Thus, there are no difficult constraints set at the SerDes hardware design level. Additionally, the system may simply employ standard oversamplers to measure during runtime and to compensate the skew. Since standard oversamplers may be utilized, the system can work with various different platforms in the industry.

FIG. 1A is a schematic diagram 100 depicting an architecture of a free running data recovery unit (DRU). In this figure, a reference clock 110 has a reference frequency (f) in Hertz (Hz). The reference clock 110 synchronizes a DRU 130 by the reference frequency (f). The reference frequency (f) is multiplied, by a multiplier 120, by N to produce an oversampling frequency (F), where $F=N*f$. A free running oversampler 140 is synchronized by the oversampling frequency (F) in Hz. As such, the free running oversampler 140 and the DRU 130 are operating synchronously to the reference clock 110.

Also in this figure, at least one serial data signal 150, containing data, is shown to be inputted into the free running oversampler 140. The free running oversampler 140 samples data from at least one serial data signal 150, and outputs at least one sampled signal 170, via N wires 160, to the DRU 130. The DRU 130 selects the data samples that are the most closely located to the center of the eye diagram. The resolution (R) of the DRU 130 (in this context, higher resolution translates into higher high-frequency jitter tolerance) is limited by the oversampling frequency (F). It should be noted that the resolution (R) is equal to 1/F. The DRU 130 outputs at least one output data signal 180 and at least one enable signal 190. The enable signal 190 is used to indicate which data bits in the output data signal 180 are valid sampled data. For example, when a data bit in the output data signal 180 is valid, the enable signal 190 will output a "1", and when a data bit in the output data signal 180 is not valid, the enable signal 190 will output a "0".

Figure 1B:
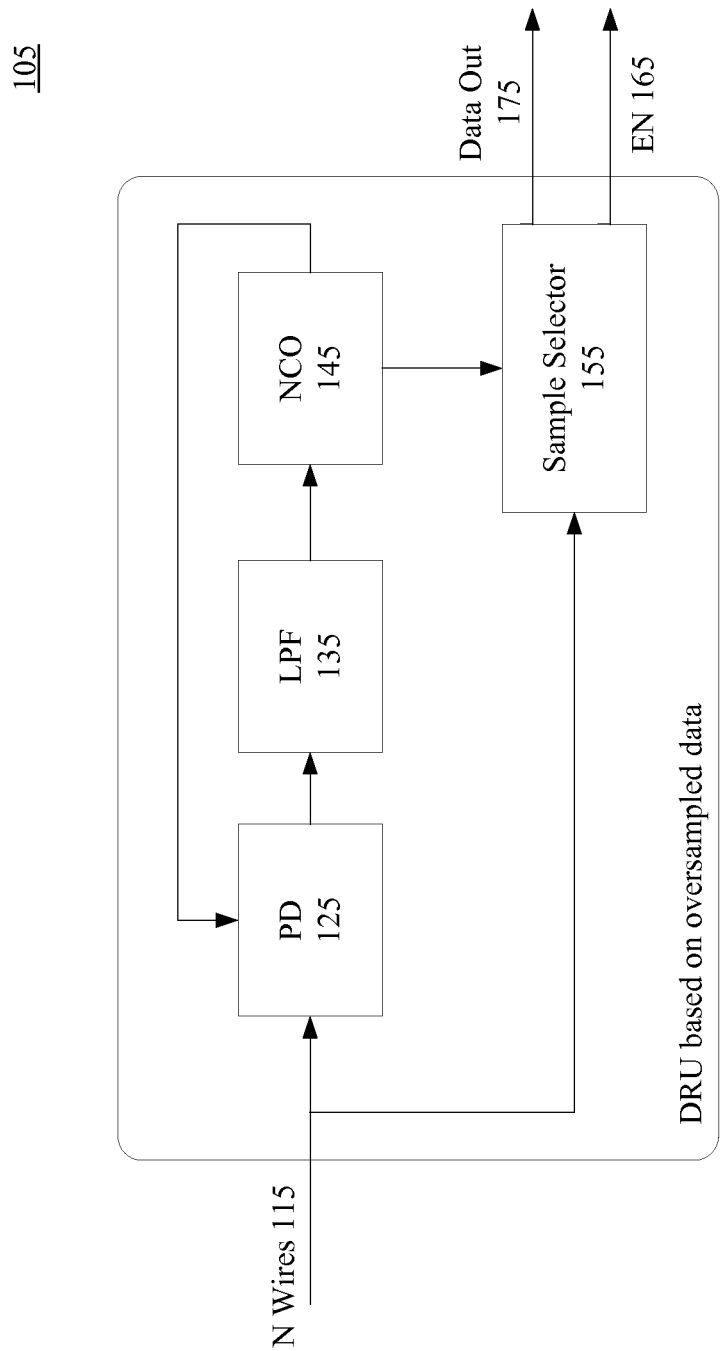
FIG. 1B is a schematic diagram illustrating a structure of a DRU.

FIG. 1B is a schematic diagram illustrating a structure of a DRU 105. The DRU 105 may be the DRU 130 of FIG. 1A. As shown in FIG. 1B, at least one input signal, via N wires 115, is inputted into a phase detector (PD) 125. At least one output signal from the phase detector 125 is inputted into a low pass filter (LPF) 135. Also, at least one output signal from the LPF 135 is inputted into a numerically controlled oscillator (NCO) 145. At least one output signal from the NCO 145 is fed back (i.e., via a negative feedback loop) into the phase detector (PD) 125. At least one output signal from the NCO 145 and at least one input signal are inputted into a sample selector 155. The sample selector 155 selects the data samples from the signal that are the most closely located to the center of the eye diagram, and outputs at least one enable signal 165 and at least one data out signal 175.

Figure 2:
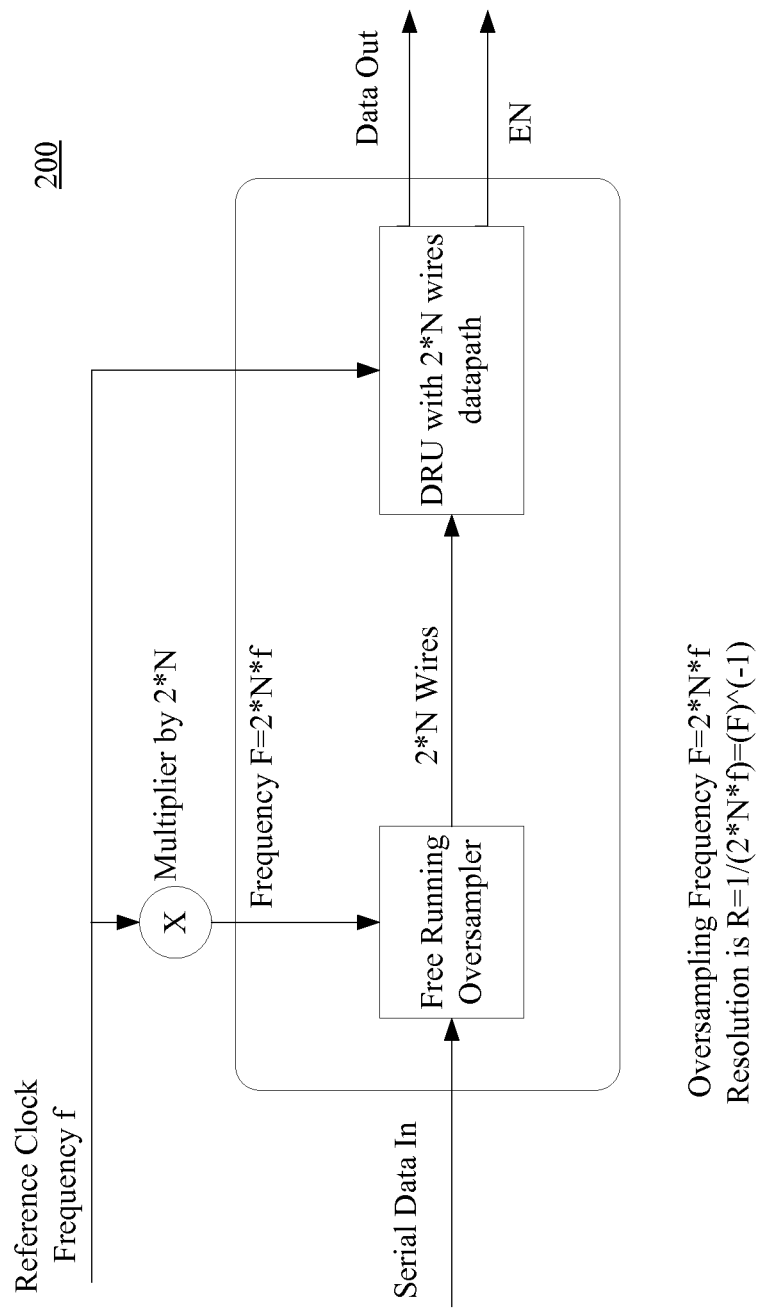
FIG. 2 is a schematic diagram showing an architecture of a free running DRU operating with double resolution.

FIG. 2 is a schematic diagram 200 showing the architecture of a free running DRU operating with double resolution. This figure illustrates a simple way to improve the resolution of a DRU by a factor of two (2) by simply oversampling the data at double the rate (i.e., the oversampling frequency $F=2*N*f$). However, this implementation may not always be possible due to of hardware limitations, as was previously discussed above.

Figure 3:
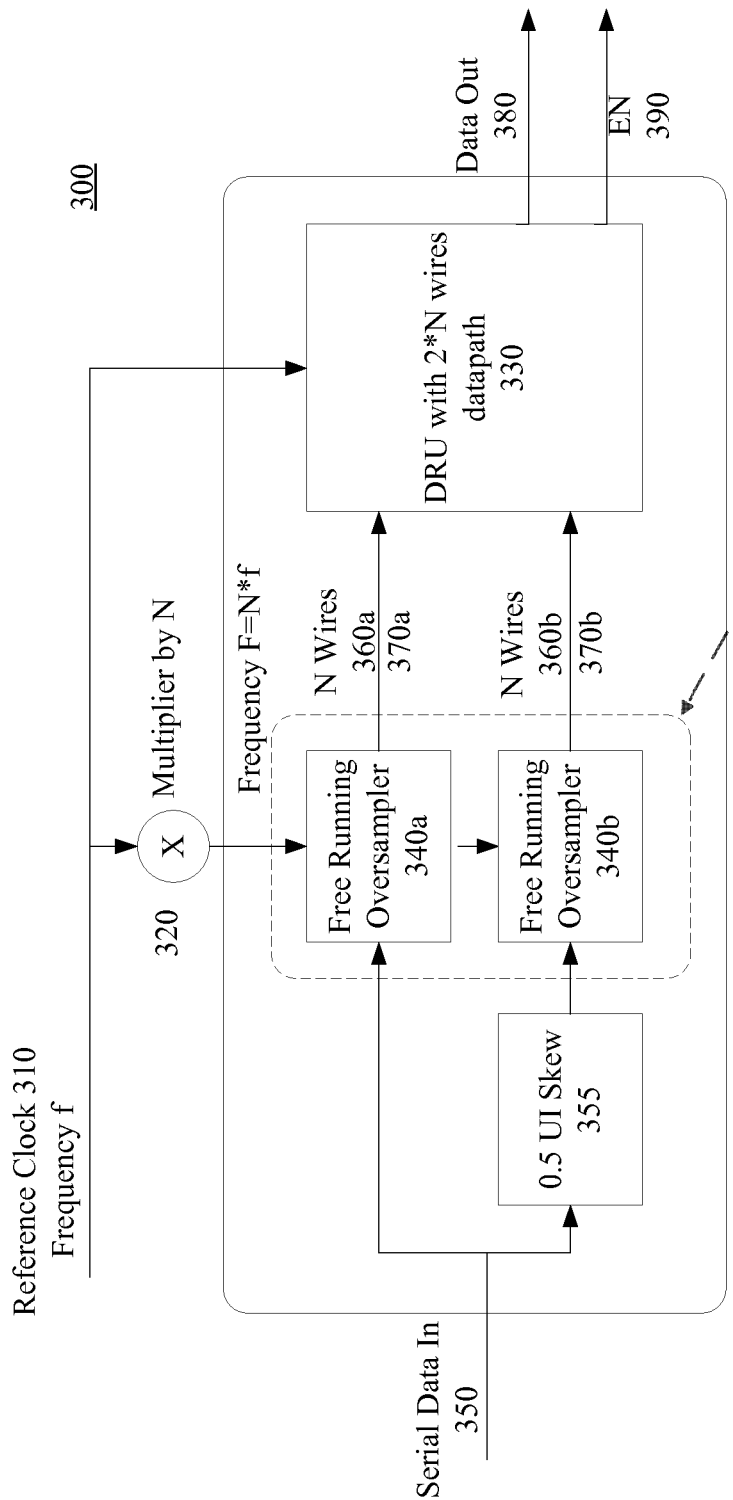
FIG. 3 is a schematic diagram showing an architecture of a free running DRU using matched and interleaved free running oversamplers.

FIG. 3 is a schematic diagram 300 showing the architecture of a free running DRU using matched and interleaved free running oversamplers 340a, 340b. In this figure, a reference clock 310 has a reference frequency (f) in Hertz (Hz). The reference clock 310 synchronizes a DRU 330 by the reference frequency (f). The reference frequency (f) is multiplied, by a multiplier 320, by N to produce an oversampling frequency (F), where $F=N*f$. Two free running oversamplers 340a, 340b are synchronized by the oversampling frequency (F) in Hz. As such, the two free running oversamplers 340a, 340b as well as the DRU 330 are operating synchronously to the reference clock 310. Although X=2 free running oversamplers 340a, 340b are shown in FIG. 3, in other embodiments there may be more than two free running oversamplers.

Also in this figure, at least one serial data signal 350, containing data, is shown to be inputted into the free running oversampler 340a. In addition, at least one serial data signal 350 is shown to be inputted into a skew unit 355 to skew the serial data signal(s) 350 by 0.5 unit interval (UI). At least one output signal from the skew unit 355 is inputted into the free running oversampler 340b.

The free running oversampler 340a samples data from at least one serial data signal 350, and outputs at least one sampled signal 370a, via N wires 360a, to the DRU 330. Also, the free running oversampler 340b samples data from at least one output signal from the skew unit 355, and outputs at least one sampled signal 370b, via N wires 360b, to the DRU 330. The DRU 330 selects the data samples that are the most closely located to the center of the eye diagram. The DRU 330 outputs at least one output data signal 380 and at least one enable signal 390. The enable signal 390 is used to indicate which data bits in the output data signal 380 are valid sampled data. For example, when a data bit in the output data signal 380 is valid, the enable signal 390 will output a "1", and when a data bit in the output data signal 380 is not valid, the enable signal 390 will output a "0". The enable signal 390 may have other values in other embodiments.

The oversampled data from the two free running oversamplers 340a, 340b is interleaved (e.g., oversampler 340a generates odd samples, and oversampler 340b generates even samples, or vice versa). In the illustrated example, the resolution (R) is $1/(N*F)$. However, the resolution (R) may be anywhere from $1/(N*F)$ to $1/(2*N*F)$ (the lower the resolution, the better). The optimal condition (e.g., $R=1/(2*N*F)$) may be achieved if the skew between the two free running oversamplers 340a, 340b is controlled to be half a unit interval (i.e., 0.5 UI), which is equal to R/2.

In some applications, the delay R/2 may be implemented by shifting appropriately the sampling phase of oversampler 340b, but it may be difficult to guarantee that the skew between the two free running oversamplers 340a, 340b is matched over PVT variations. The embodiment shown in FIG. 4 is designed to overcome this challenge.

Figure 4:
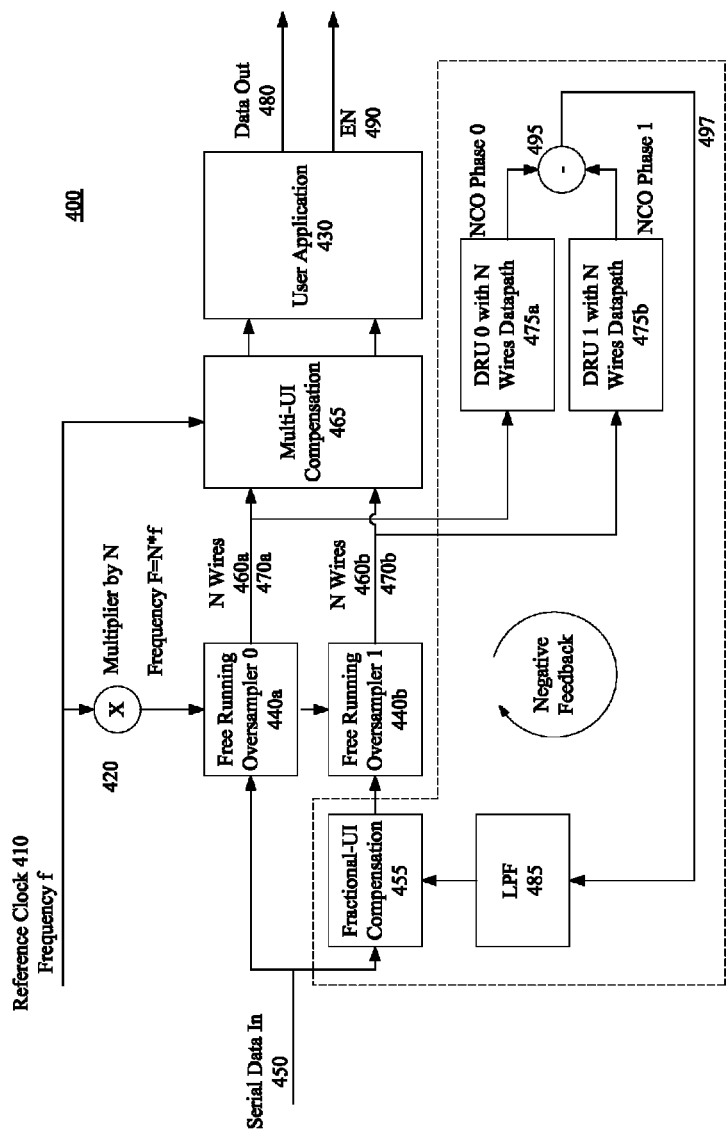
FIG. 4 is a schematic diagram of a system for increasing the resolution of serial DRUs based on interleaved free running oversamplers.

FIG. 4 shows a system 400 for increasing the resolution of serial DRUs based on interleaved free running oversamplers. In this figure, a reference clock 410 has a reference frequency (f) in Hertz (Hz). The reference clock 410 synchronizes a user application 430 (e.g., a DRU) by the reference frequency (f). The reference frequency (f) is multiplied, by a multiplier 420, by N to produce an oversampling frequency (F), where $F=N*f$. Two (X=2) free running oversamplers 440a, 440b are synchronized by the oversampling frequency (F) in Hz. As such, the two free running oversamplers 440a, 440b as well as the user application 430 are operating synchronously to the reference clock 410.

Also in this figure, the free running oversampler 440a outputs at least one sampled signal 470a, via N wires 460a, to a DRU 475a. The free running oversampler 440b outputs at least one sampled signal 470b, via N wires 460b, to a DRU 475b. Output signals from the DRUs 475a, 475b are differenced by a skew detector 495 to produce a skew signal 497. The skew measurement signal 497 is inputted into a low pass filter (LPF) 485. The filtered skew measurement signal from the LPF 485 is then inputted into a fractional-unit interval (UI) compensation unit 455.

In addition, at least one serial data signal 450 is inputted into the fractional-UI compensation unit 455. The fractional-UI compensation unit 455 skews the serial data signal(s) 450 to be 0.5 UI (i.e., by a fractional skew). Also, at least one serial data signal 450 is shown to be inputted into the free running oversampler 440a. Additionally, an output signal from the fractional-UI compensation unit 455 is inputted into the free running oversampler 440b.

Also in this figure, the free running oversampler 440a outputs at least one sampled signal 470a, via N wires 460a, to a multi-UI compensation unit 465. The free running oversampler 440b outputs at least one sampled signal 470b, via N wires 460b, also to the multi-UI compensation unit 465. The multi-UI compensation unit 465 adjusts the delay to compensate for any skew that is a multiple of R (i.e., the coarse skew). At least one output signal from the multi-UI compensation unit 465 is inputted into the user application 430. The user application 430 outputs at least one output data signal 480 and at least one enable signal 490. The enable signal 490 is used to indicate which data bits in the output data signal 480 are valid sampled data. For example, when a data bit in the output data signal 480 is valid, the enable signal 490 will output a "1", and when a data bit in the output data signal 480 is not valid, the enable signal 390 will output a "0". The enable signal 490 may have other values in other embodiments.

It should be noted that in FIG. 4, the two additional DRUs 475a, 475b, operating on the same reference clock 410 as the user application 430 (e.g., the main DRU), are operating independently on the data from the free running oversamplers 440a, 440b, with a resolution of R/2. Each DRU 475a, 475b operates independently from each other. In some embodiments, each DRU 475a, 475b may have the architecture shown in FIG. 1B, and may have an NCO (e.g., NCO 145). Referring back to FIG. 4, when locked, the NCO inside each of the DRUs 475a, 475b will output the phase of the incoming data signal compared to the phase of the clock oversampling the data. Of course, the difference between the two phases (NCO phase 0 and NCO phase 1) is a measure of the fractional portion of the skew (i.e., the fractional skew) difference between the free running oversamplers 440a, 440b, including the delay in the path. When the skew is different from the target value (e.g., 0.5), the delay element is tuned slowly during runtime to maintain the overall skew equal to the target value. The negative feedback depicted in FIG. 4 compensates for any PVT variation that might occur.

The depicted structure of FIG. 4 may employ standard free running oversamplers (i.e., for which no special care has been taken at the design level to minimize the relative skew) for the two free running oversampler 440a, 440b. It should be noted that the fractional-UI compensation unit 455 can measure and correct for the fractional portion of the skew (i.e., below one (1) unit interval (UI), which is synonymous with 1/F in this context). For example, if the skew is 4.3 UI, the 0.3 UI will be measured and compensated by the fractional-UI compensation unit 455.

It should also be noted that each of the free running oversamplers 440a, 440b may have divider(s) and FIFO(s), which can insert a relative skew that is a multiple of the period R (i.e., a coarse skew; in the previous example, this would be 4 UI). This portion of the relative skew changes at each startup, but remains constant over PVT variations. In some embodiments, this skew is compensated for each time after startup. Being a multiple of 1/F, the skew may be compensated for digitally in the field-programmable gate array (FPGA) fabric. This is the functionality of the multi-UI compensation unit 465. At startup, the multi-UI compensation unit 465 adjusts its delay to compensate for any skew that is a multiple of R (i.e., the coarse skew).

The fractional-UI compensation unit 455 compensating for the fractional skew and the multi-UI compensation unit 465 compensating for the coarse skew may operate independently. The precision of the fractional-UI compensation unit 455 is negatively affected if the incoming data signal 450 has a data rate that is frequency locked to the reference clock 410. Thus, it may be desirable to select a reference clock 410 which is asynchronous to the frequency of the incoming data signal 450.

In the illustrated embodiments, there are two free running oversamplers 440 (i.e., X=2). However, in other embodiments, there may be more than two free running oversamplers 440 (i.e., X>2). It should be noted that for X free running oversamplers 440 (X is an integer of at least two), there are X−1 fractional-UI compensation units 455.

Figure 5:
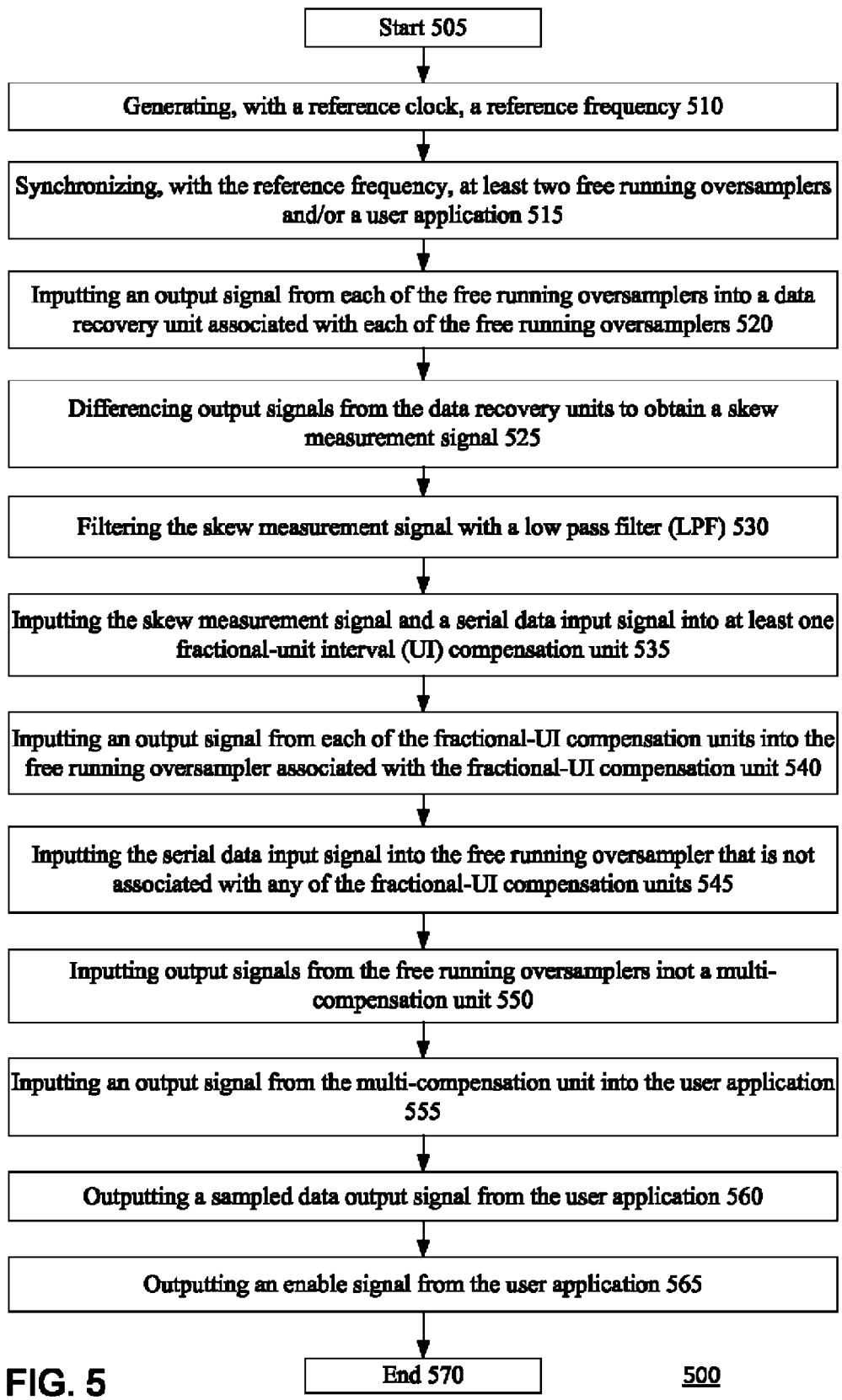
FIG. 5 is a flow chart showing a method of operation for the system of FIG. 4.

FIG. 5 is a flow chart showing a method 500 of operation of the system of FIG. 4. At the start (Item 505) of the method 500, a reference clock generates a reference frequency (f) (Item 510). The reference frequency (f) is used to synchronize at least two free running oversamplers 440a, 440b and/or a user application 430 (Item 515). Then, an output signal from each of the free running oversamplers 440a, 440b is inputted into a respective data recovery unit 475 (e.g., 475a, 475b) associated with each of the free running oversamplers 440a, 440b, where there are X free running oversamplers (Item 520). Output signals from the data recovery units 475a, 475b are then differenced to obtain a skew measurement signal 497 (Item 525). Then, the skew measurement signal 497 is filtered with a low pass filter (LPF) 485 (Item 530).

The skew measurement signal and a serial data input signal are then inputted into at least one fractional-unit interval (UI) compensation unit 455, where there are X−1 fractional-UI compensation unit(s) 455 (Item 535). The output signal from each fractional-UI compensation unit 455 is inputted into the free running oversampler 440b associated with the fractional-UI compensation unit 455 (Item 540). Also, the serial data input signal is inputted into the free running oversampler 440a that is not associated with any of the fractional-UI compensation units 455 (Item 545).

Then, output signals from the free running oversamplers 440a, 440b are inputted into a multi-UI compensation unit 465 (Item 550). An output signal from the multi-UI compensation unit 465 is inputted into the user application 430 (Item 555). Then, a sampled data output signal 480 is outputted from the user application 430 (item 560). Also, an enable signal 490 is outputted from the user application 430 (Item 565). Then, the method 500 ends at Item 570.

In the above example, there are X=2 free running oversamplers. In other embodiments, X may be larger than 2. In either case, the number of fractional-UI compensation units 455 is equal to X−1.

Figure 6:
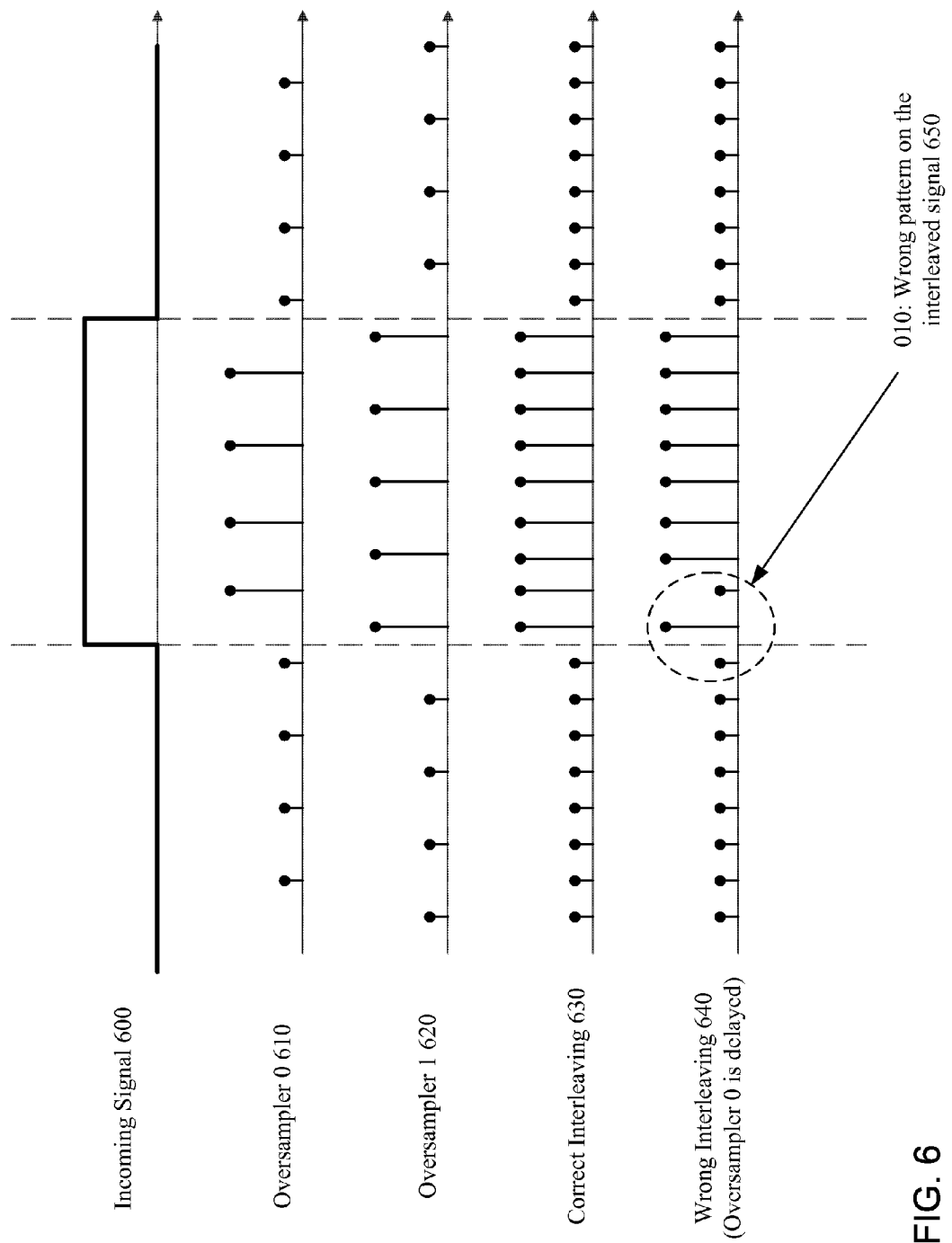
FIG. 6 shows graphs relating to the system of FIG. 4.

FIG. 6 contains a series of graphs 600, 610, 620, 630, 640 relating to the system 400 of FIG. 4. In this figure, graph 600 depicts an exemplary incoming data signal. Graph 610 shows the output digital signal from free running oversampler 440a after it has sampled the data signal of graph 600, and graph 620 shows the output digital signal from free running oversampler 440b after it has sampled the data signal of graph 600. For this example, free running oversampler 440a and free running oversampler 440b are interleaved, which is achieved by the negative loop in FIG. 4. As such, the free running oversamplers 440a, 440b can only have a residual reciprocal multi-UI skew.

Graph 630 shows a signal exhibiting correct interleaving of the signals in graphs 610 and 620. Graph 640 shows a signal exhibiting the wrong interleaving of the signals in graphs 610 and 620, as is evidenced by the "010" pattern 650 in the interleaved signal. The "010" pattern indicates the presence of a multi-UI compensation error of the skew (i.e., a coarse skew error). The multi-UI compensation unit 465 will find the correct interleaving skew based on an identification of the "010" and/or "101" pattern, because all incorrect positions will exhibit a "010" or "101" in the interleaved pattern.

Figure 7:
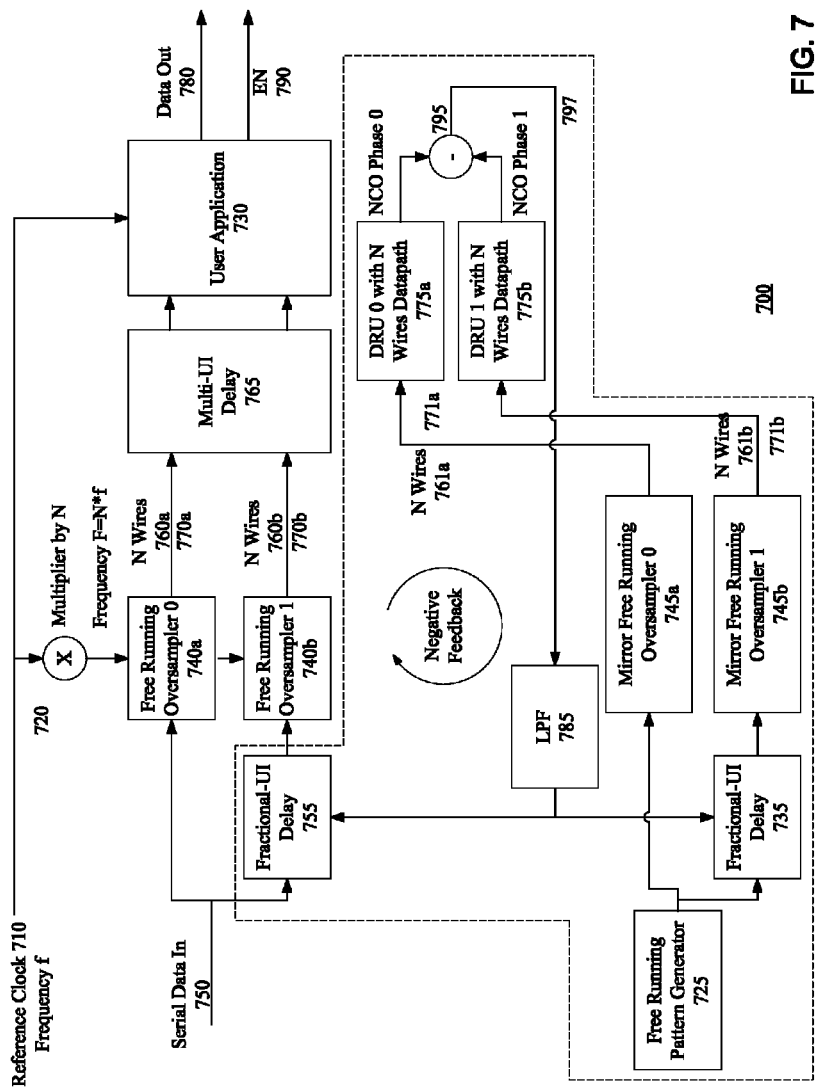
FIG. 7 is a schematic diagram of a system for increasing the resolution of serial DRUs based on interleaved free running oversamplers.

FIG. 7 illustrates another system 700 for increasing the resolution of serial DRUs based on interleaved free running oversamplers. In this figure, a reference clock 710 has a reference frequency (f) in Hertz (Hz). The reference clock 710 synchronizes a user application 730 (e.g., a DRU) with the reference frequency (f). The reference frequency (f) is multiplied, by a multiplier 720, by N to produce an oversampling frequency (F), where F=N*f. Two free running oversamplers 740a, 740b are synchronized by the oversampling frequency (F) in Hz. As such, the two free running oversamplers 740a, 740b as well as the user application 730 are operating synchronously to the reference clock 710.

Also in this figure, a mirror free running oversampler 745a mirrors free running oversampler 440a, and a mirror free running oversampler 745b mirrors free running oversampler 440b. The mirror free running oversampler 745a outputs at least one sampled signal 771a, via N wires 761a, to a DRU 775a. Also, the mirror free running oversampler 745b outputs at least one sampled signal 771b, via N wires 761b, to a DRU 775b. Output signals from the DRUs 775a, 775b are differenced by a skew detector 795 to produce a skew measurement signal 797. The skew measurement signal 797 is inputted into a low pass filter (LPF) 785.

The filtered skew measurement signal is then inputted into a fractional-unit interval (UI) compensation unit 755 as well as a mirror fractional-UI compensation unit 735. The fractional-UI compensation unit 755 and the mirror fractional-UI compensation unit 735 skews the signals to be 0.5 UI (i.e., by a fractional skew). A free running pattern generator 725 generates at least one free running pattern signal. At least one free running pattern signal is outputted from the free running pattern generator 725, and inputted into mirror free running oversampler 745a, and into the mirror fractional-UI compensation unit 735. At least one output signal from the mirror fractional-UI compensation unit 735 is inputted into the mirror free running oversampler 745b.

Also in this figure, at least one serial data signal 750 is shown to be inputted into the free running oversampler 740a. Also, at least one serial data signal 750 is shown to be inputted into the fractional-UI compensation unit 755. Additionally, an output signal from the fractional-UI compensation unit 755 is inputted into the free running oversampler 740b. The free running oversampler 740a (i.e., the oversampler not associated with the fractional-UI compensation unit 755) outputs at least one sampled signal 770a, via N wires 760a, to a multi-UI compensation unit 765. Also, the free running oversampler 740b (i.e., the oversampler associated with the fractional-UI compensation unit 755) outputs at least one sampled signal 770b, via N wires 760b, to the multi-UI compensation unit 765. The multi-UI compensation unit 765 adjusts the delay to compensate for any skew that is a multiple of R (i.e., the coarse skew). At least one output signal from the multi-UI compensation unit 765 is inputted into the user application 730. The user application 730 outputs at least one output data signal 780 and at least one enable signal 790. The enable signal 790 is used to indicate which data bits in the output data signal 780 are valid sampled data. For example, when a data bit in the output data signal 780 is valid, the enable signal 790 will output a "1", and when a data bit in the output data signal 780 is not valid, the enable signal 790 will output a "0". The enable signal 490 may have other values in other embodiments.

It should be noted that the user application 730 of FIG. 7 (as well as the user application 430 of FIG. 4) may be various different items in different embodiments. For example, in some embodiments, the user application 430/730 may be a DRU. In addition, the user application 430, 730 may have various different functions including, but not limited to: burst data synchronization (for this application, data appears in burst, where each burst has a different phase), and interval measurement (for this application, the length of an event may be measured with high resolution).

In the illustrated embodiments, there are two free running oversamplers 740 (i.e., X=2). In other embodiments, there may be more than two free running oversamplers (i.e., X>2). It should be noted that for X free running samplers 740 (first free running samplers 740), there are X mirror free running oversamplers 745 (second running samplers 745), X−1 fractional-UI compensation units 755 (first fractional-UI compensation units 755), and X−1 mirror fractional-UI compensation units 735 (second fractional-UI compensation units 735).

Figure 8A:
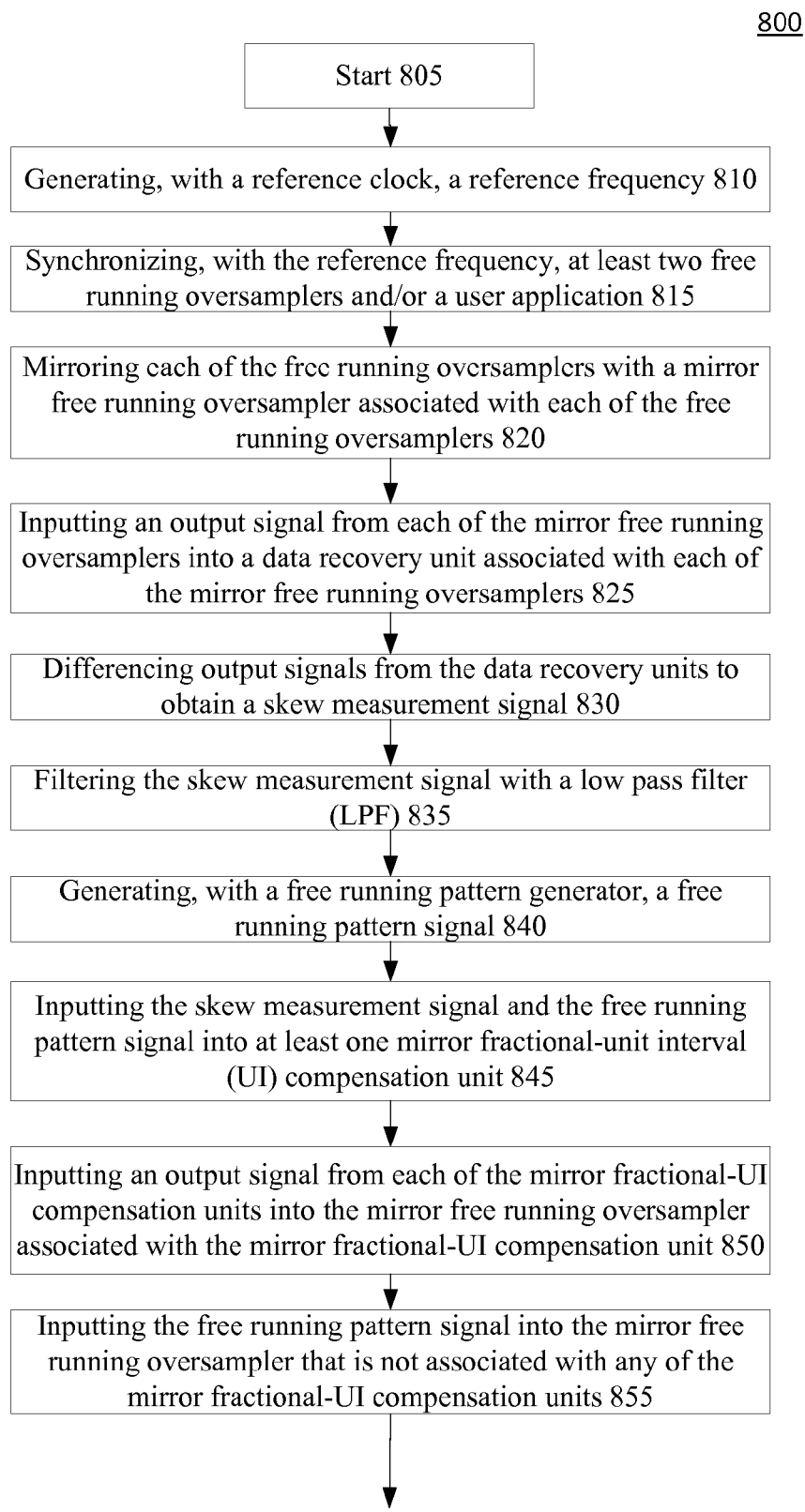
FIGS. 8A and 8B depict a flow chart showing a method of operation for the system of FIG. 7.
Figure 8B:
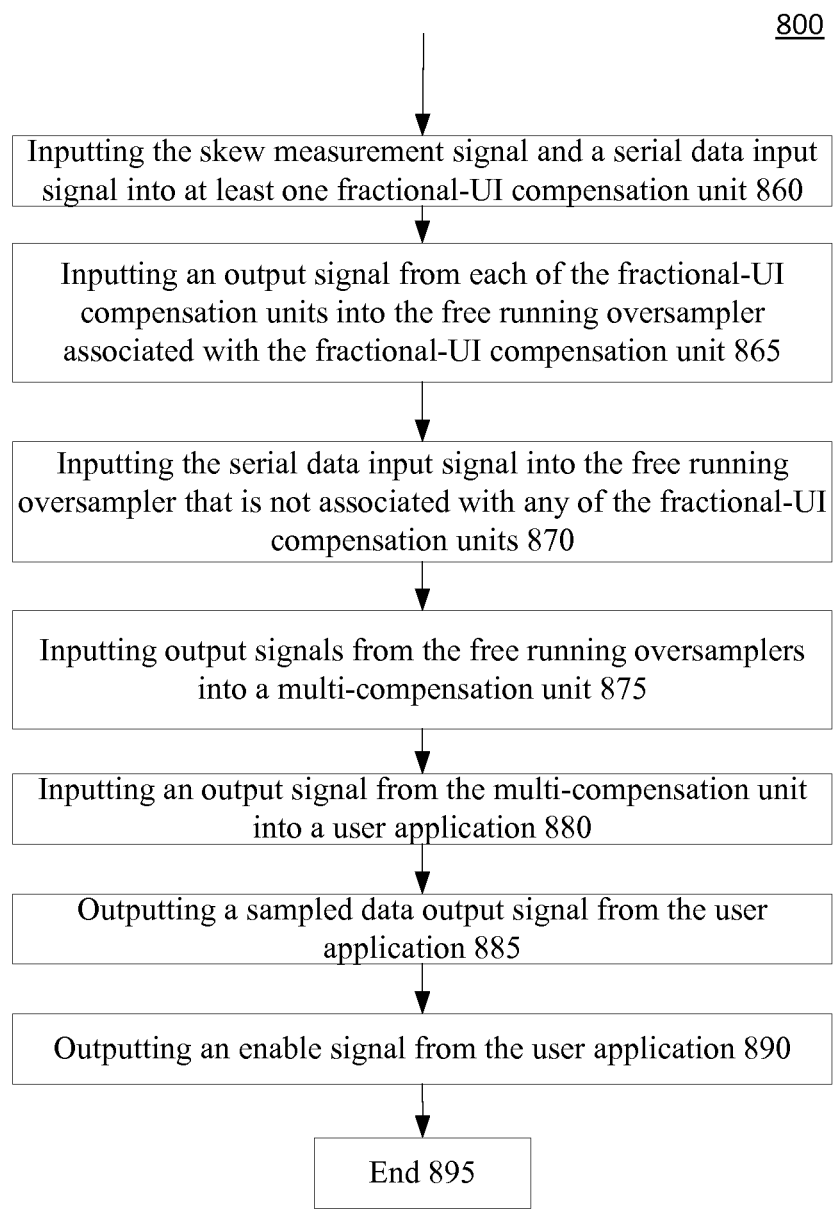

FIGS. 8A and 8B depict a flow chart showing an exemplary method 800 of operation for the system 700 of FIG. 7. At the start (Item 805) of the method 800, the reference clock 710 generates a reference frequency (f) (Item 810). The reference frequency (f) is used to synchronize at least two free running oversamplers 740 and/or a user application 730 (Item 815). Then, each of the free running oversamplers 740 are mirrored with a mirror free running oversampler 745 associated with each of the free running oversamplers 740, where there are X free running oversamplers 740 (Item 820). An output signal from each of the mirror free running oversamplers 745 is inputted into a respective data recovery unit 775 associated with each of the mirror free running oversamplers 745 (Item 825).

Then, output signals from the data recovery units 775 are differenced to obtain a skew measurement signal 797 (Item 830). The skew measurement signal 797 is then filtered with the low pass filter (LPF) 785 (Item 835). The free running pattern generator 725 then generates a free running pattern signal (Item 840).

Then, the skew measurement signal and the free running pattern signal are inputted into at least one mirror fractional-unit interval (UI) compensation unit 735, where there are X−1 mirror fractional-UI compensation unit(s) 735 (Item 845). An output signal from each of the mirror fractional-UI compensation unit(s) 735 is then inputted into a respective mirror free running oversampler 745 (mirror free running oversampler 745b in the example) associated with the mirror fractional-UI compensation unit 735 (Item 850). Then, the free running pattern signal is inputted into the mirror free running oversampler 745 (the mirror free running oversampler 745a in the example) that is not associated with any of the mirror fractional-UI compensation units 735 (Item 855).

The filtered skew measurement signal from the LPF 785 and a serial data input signal 750 are inputted into at least one fractional-UI compensation unit 755, where there are X−1 fractional-UI compensation unit(s) 755 (Item 806). An output signal from each of the fractional-UI compensation unit(s) 755 is inputted into the respective free running oversampler 740 (free running oversampler 740b in the example) associated with the fractional-UI compensation unit 755 (Item 865). The serial data input signal is inputted into the free running oversampler 740 (the free running oversampler 740*a* in the example) that is not associated with any of the fractional-UI compensation units 755 (Item 870).

Output signals from the free running oversamplers 740 are then inputted into the multi-UI compensation unit 765 (Item 875). An output signal from the multi-UI compensation unit is inputted into the user application 880. A sampled data output signal is outputted from the user application 730 (Item 885). Also, an enable signal is outputted from the user application 730 (Item 890). The illustrated method 800 ends at item 895.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A system for increasing resolution of recovery of serial data, the system comprising:
X free running oversamplers, wherein X is an integer that is at least two;
X−1 fractional-unit interval (UI) compensation unit(s) coupled to receive a serial data input signal;
wherein the fractional-UI compensation unit(s) is associated with respective one(s) of the free running oversamplers, wherein one of the free running oversamplers not associated with any of the fractional-UI compensation unit(s) is coupled to receive the serial data input signal, and the remaining one(s) of the free running oversamplers is coupled to receive respective output signal(s) from the respective fractional-UI compensation unit(s);
a plurality of data recovery units coupled with respective ones of the free running over samplers, wherein the data recovery units are configured to provide respective output signals based at least in part on output signals from the respective free running oversamplers;
a skew detector configured to difference the output signals from the data recovery units and to generate a skew measurement signal;
wherein the fractional-UI compensation unit(s) is configured to provide the output signal(s) for the respective one(s) of the free running oversamplers based at least in part on the skew measurement signal;
a multi-UI compensation unit coupled to receive output signals from the free running oversamplers; and
a user application configured to output a sampled data output signal based at least in part on an output signal from the multi-UI compensation unit.

2. The system of claim 1, further comprising a reference clock configured to synchronize, with a reference frequency, at least one of the free running oversamplers or the user application.

3. The system of claim 1, further comprising a low pass filter (LPF) configured to filter the skew measurement signal.

4. The system of claim 1, wherein the user application comprises a data recovery unit.

5. The system of claim 1, wherein the user application is further configured to output an enable signal.

6. The system of claim 1, wherein the fractional-UI compensation unit(s) is configured to compensate a skew from the skew measurement signal.

7. A system for increasing resolution of recovery of serial data, the system comprising:
X first free running oversamplers, wherein X is an integer that is at least two;
X second free running oversamplers coupled with respective ones of the first free running oversamplers to mirror the respective ones of the free running oversamplers;
X−1 first fractional-unit interval (UI) compensation unit(s) coupled to receive a serial data input signal;
wherein the first fractional-UI compensation unit(s) is associated with respective one(s) of the first free running oversamplers, wherein one of the first free running oversamplers not associated with any of the first fractional-UI compensation unit(s) is coupled to receive the serial data input signal, and the remaining one(s) of the first free running oversamplers is coupled to receive output signal(s) from the respective first fractional-UI compensation unit(s);
X−1 second fractional-UI compensation unit(s) coupled to receive a free running pattern signal;
wherein the second fractional-UI compensation unit(s) is coupled with respective one(s) of the second free running oversamplers, wherein one of the second free running oversamplers not associated with any of the second fractional-UI compensation unit(s) is coupled to receive a free running pattern signal, and the remaining one(s) of the second free running oversamplers is coupled to receive output signal(s) from the respective second fractional-UI compensation unit(s);
a plurality of data recovery units coupled with respective ones of the second free running over samplers, wherein the data recovery units are configured to provide respect output signal(s) based at least in part on output signals from the respective second free running oversamplers;
a skew detector configured to difference output signals from the data recovery units to generate a skew measurement signal;
wherein the first fractional-UI compensation unit(s) is configured to provide the output signal(s) for the respective one(s) of the first free running oversamplers based at least in part on the skew measurement signal;
wherein the second fractional-UI compensation unit(s) is configured to provide the output signal(s) for the respective one(s) of the second free running oversamplers based at least in part on the skew measurement signal;
a multi-UI compensation unit coupled to receive output signals from the first free running oversamplers; and
a user application configured to output a sampled data output signal based at least in part on an output signal from the multi-UI compensation unit.

8. The system of claim 7, further comprising a free running pattern generator configured to generate the free running pattern signal.

9. The system of claim 7, further comprising a reference clock to synchronize, with a reference frequency, at least one of the first free running oversamplers, the second free running oversamplers, or the user application.

10. The system of claim 7, further comprising a low pass filter (LPF) configured to filter the skew measurement signal.

11. The system of claim 7, wherein the user application comprises a data recovery unit.

12. The system of claim 11, wherein the user application is further configured to output an enable signal.

13. The system of claim 7, wherein each of the first fractional-UI compensation unit(s) and the second fractional-UI compensation unit(s) is configured to compensate a skew from the skew measurement signal.

14. A method for increasing resolution of recovery of serial data, comprising:

mirroring X first free running oversamplers with respective X second free running oversamplers, wherein X is an integer that is at least two, and wherein there are X−1 first fractional-unit interval (UI) compensation unit(s) associated with respective one(s) of the first free running oversamplers, and X−1 second fractional-UI compensation unit(s) associated with respective one(s) of the second free running oversamplers;

receiving a free running pattern signal at the second fractional-UI compensation unit(s);

providing output signal(s) from the second fractional-UI compensation unit(s) for respective one(s) of the second free running oversamplers that is associated with the second fractional-UI compensation unit(s);

receiving the free running pattern signal at one of the second free running oversamplers that is not associated with any of the second fractional-UI compensation unit(s);

providing output signals from data recovery units that are associated with the respective second free running oversamplers based at least in part on output signals from the respective second free running oversamplers;

differencing the output signals from the data recovery units to obtain a skew measurement signal;

receiving serial data input signal(s) at the first fractional-UI compensation unit(s);

providing output signal(s) from the second fractional-UI compensation unit(s) for respective one(s) of the first free running oversamplers that is associated with the first fractional-UI compensation unit(s);

receiving the serial data input signal at one of the first free running oversamplers that is not associated with any of the first fractional-UI compensation unit(s);

providing an output from a multi-UI compensation unit based at least in part on output signals provided from the first free running oversamplers; and outputting a sampled data output signal from a user application based at least in part on the output from the multi-UI compensation unit;

wherein the output signal(s) from the second fractional-UI compensation unit(s) is provided based at least in part on the skew measurement signal; and wherein the output signal(s) from the first fractional-UI compensation unit(s) is provided based at least in part on the skew measurement signal.

15. The method of claim 14, further comprising generating the free running pattern signal.

16. The method of claim 14, further comprising synchronizing, with a reference frequency, at least one of the first free running oversamplers, the second free running oversamplers, or the user application.

17. The method of claim 16, further comprising generating the reference frequency.

18. The method of claim 14, further comprising filtering the skew measurement signal with a low pass filter (LPF).

19. The method of claim 14, wherein the user application comprises a data recovery unit.

20. The method of claim 14, wherein each of the first fractional-UI compensation unit(s) and the second fractional-UI compensation unit(s) compensates a skew from the skew measurement signal.

* * * * *